(12) United States Patent  (10) Patent No.: US 8,920,273 B2
Doi et al. (45) Date of Patent: Dec. 30, 2014

(54) V-BELT FOR TRANSMITTING HIGH LOAD (71) Applicant: Bando Chemical Industries, Ltd., Kobe-shi (JP)

(72) Inventors: Ikuhito Doi, Kobe (JP); Takashi Nishikawa, Kobe (JP); Ryuichi Kido, Kobe (JP); Hiroyuki Sakanaka, Kobe (JP)

(73) Assignee: Bando Chemical Industries, Ltd., Kobe-Shi (JP)

( * ) Notice: Subject to any disclaimer, the term of this patent is extended or adjusted under 35 U.S.C. 154(b) by 0 days.

(21) Appl. No.: 14/216,804

(22) Filed: Mar. 17, 2014

(65) Prior Publication Data

US 2014/0200107 A1    Jul. 17, 2014

Related U.S. Application Data

(63) Continuation of application No. PCT/JP2013/001771, filed on Mar. 15, 2013.

(30) Foreign Application Priority Data

Mar. 19, 2012   (JP) .................... 2012-061570

(51) Int. Cl.
   *F16G 1/21*  (2006.01)
   *F16G 1/22*  (2006.01)
   *F16G 5/16*  (2006.01)

(52) U.S. Cl.
   USPC ........................................ 474/242

(58) Field of Classification Search
   USPC ........................................ 474/242
   See application file for complete search history.

(56) References Cited

U.S. PATENT DOCUMENTS

| | | | | |
|---|---|---|---|---|
| 4,734,085 A * | 3/1988 | Takashima et al. | ........... | 474/242 |
| 5,776,023 A * | 7/1998 | Okawa et al. | ........... | 474/243 |
| 6,283,882 B1 * | 9/2001 | Nonaka et al. | ........... | 474/242 |
| 6,293,886 B1 * | 9/2001 | Ohkawa et al. | ........... | 474/242 |
| 6,500,086 B2 * | 12/2002 | Serkh et al. | ........... | 474/245 |
| 6,758,778 B2 * | 7/2004 | Serkh | ........... | 474/242 |
| 7,097,581 B2 * | 8/2006 | Inukai et al. | ........... | 474/242 |
| 8,740,738 B2 * | 6/2014 | Sakanaka et al. | ........... | 474/242 |
| 2001/0041636 A1 * | 11/2001 | Serkh et al. | ........... | 474/242 |
| 2001/0053726 A1 * | 12/2001 | Sattler | ........... | 474/242 |
| 2003/0087716 A1 * | 5/2003 | Tsuji et al. | ........... | 474/242 |
| 2003/0092523 A1 * | 5/2003 | Sakanaka et al. | ........... | 474/242 |

(Continued)

FOREIGN PATENT DOCUMENTS

| CN | 101779053 A | 7/2010 |
|---|---|---|
| CN | 102132067 A | 7/2011 |

(Continued)

*Primary Examiner* — Henry Liu
(74) *Attorney, Agent, or Firm* — Knobbe Martens Olson & Bear LLP (57) ABSTRACT

On each block side face of the blocks of a V-belt for transmitting high load, a ratio of a dimension extending in a belt thickness direction from a buried cord center line of a corresponding tension band to an upper end of an upper pulley-contact face to a dimension extending in the belt thickness direction from the buried cord center line to a lower end of the upper pulley-contact face is larger than or equal to 4.0, and a dimension extending in the belt thickness direction from the buried cord center line to a middle of the upper pulley-contact face is smaller than or equal to 2.3 mm.

10 Claims, 10 Drawing Sheets

(56) References Cited

U.S. PATENT DOCUMENTS

| | | | |
|---|---|---|---|
| 2003/0148842 A1* | 8/2003 | Serkh | 474/242 |
| 2004/0033855 A1* | 2/2004 | Inukai et al. | 474/242 |
| 2004/0162174 A1* | 8/2004 | Serkh | 474/242 |
| 2008/0051241 A1* | 2/2008 | Kaps et al. | 474/242 |
| 2010/0167859 A1 | 7/2010 | Sakanaka et al. | |
| 2010/0267505 A1* | 10/2010 | Oishi et al. | 474/242 |

FOREIGN PATENT DOCUMENTS

| | | |
|---|---|---|
| JP | 2000-310294 A | 11/2000 |
| JP | 2004-76849 A | 3/2004 |
| JP | 2004-347028 A | 12/2004 |
| JP | 2008-267590 A | 11/2008 |
| JP | 2011-236994 A | 11/2011 |
| JP | 2012-112438 A | 6/2012 |

* cited by examiner

V-BELT FOR TRANSMITTING HIGH LOAD

CROSS-REFERENCE TO RELATED APPLICATIONS

This is a continuation of International Application No. PCT/JP2013/001771 filed on Mar. 15, 2013, which claims priority to Japanese Patent Application No. 2012-061570 filed on Mar. 19, 2012. The entire disclosures of these applications are incorporated by reference herein.

BACKGROUND

The present disclosure relates to V-belts for transmitting high load.

A V-belt including a plurality of blocks aligned in a belt length direction and endless tension bands on which each of the blocks is fasten is known as a V-belt for transmitting high load for use in a belt-type continuously variable transmission of an automobile, an agricultural machine, a general purpose machine, etc. (See, for example, Japanese Unexamined Patent Publication No. 2011-236994.)

SUMMARY

The present disclosure relates to a V-belt for transmitting high load. The V-belt includes: two endless tension bands extending in pairs parallel to each other in a belt length direction and each including a cord which is buried therein and extends in a spiral having pitches in a belt width direction; and a plurality of blocks arranged along the two tension bands and each having fitting sections which each open on a corresponding one of both block side faces of each of the blocks, wherein one of the two tension bands is fitted into corresponding ones of the fitting sections which open on the block side faces located on a side, the other of the two tension bands is fitted into corresponding ones of the fitting sections which open on the block side faces located on the other side, in each of the blocks, a portion of each block side face located on and above the corresponding fitting section serves as an upper pulley-contact face whereas a portion of each block side face located on and below the corresponding fitting section serves as a lower pulley-contact face, and on each block side face of the blocks, a ratio of a dimension extending in a belt thickness direction from a buried cord center line of the corresponding tension band to an upper end of the upper pulley-contact face to a dimension extending in the belt thickness direction from the buried cord center line to a lower end of the upper pulley-contact face is larger than or equal to 4.0, and a dimension extending in the belt thickness direction from the buried cord center line to a middle of the upper pulley-contact face is smaller than or equal to 2.3 mm.

BRIEF DESCRIPTION OF THE DRAWINGS

FIG. 7 illustrates behavior of the blocks. Specifically, FIG. 7 illustrates that the blocks having been inclined forward are restored to the original state.

DETAILED DESCRIPTION

The present disclosure will be described below in detail with reference to the drawings.

(V-belt for Transmitting High Load)

Figure 1:
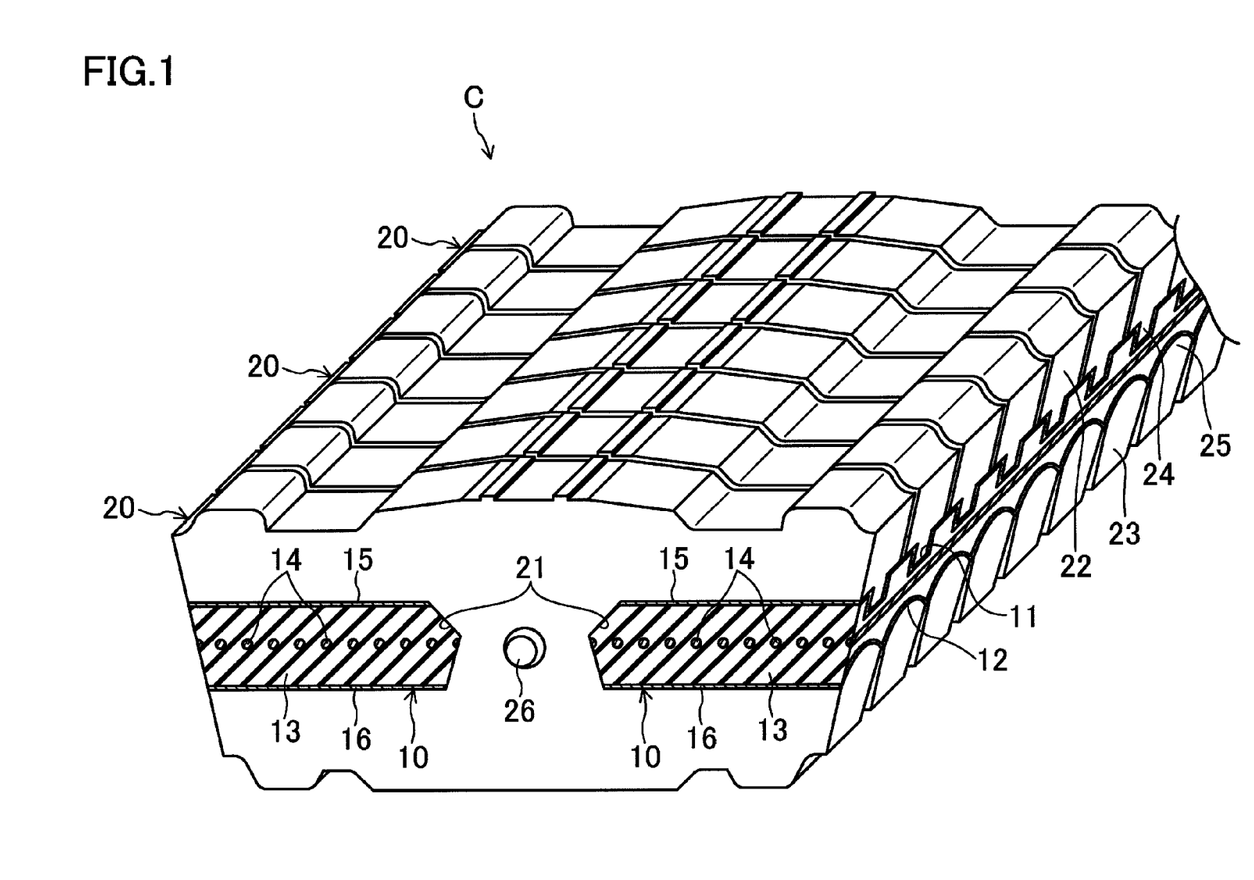
FIG. 1 is a perspective view of a portion cut out from a V-belt for transmitting high load according to an embodiment of the present disclosure.
Figure 2:
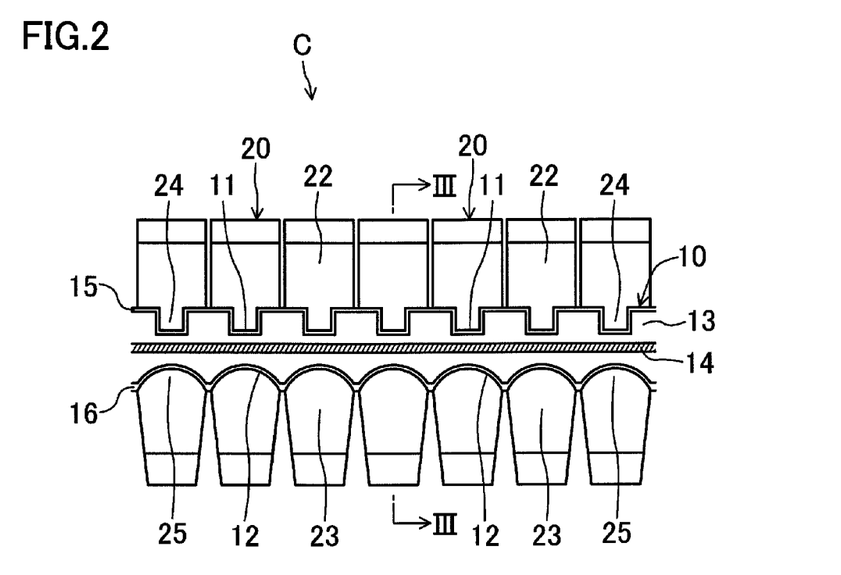
FIG. 2 is a side view of a portion of the V-belt for transmitting high load according to the embodiment.
Figure 3:
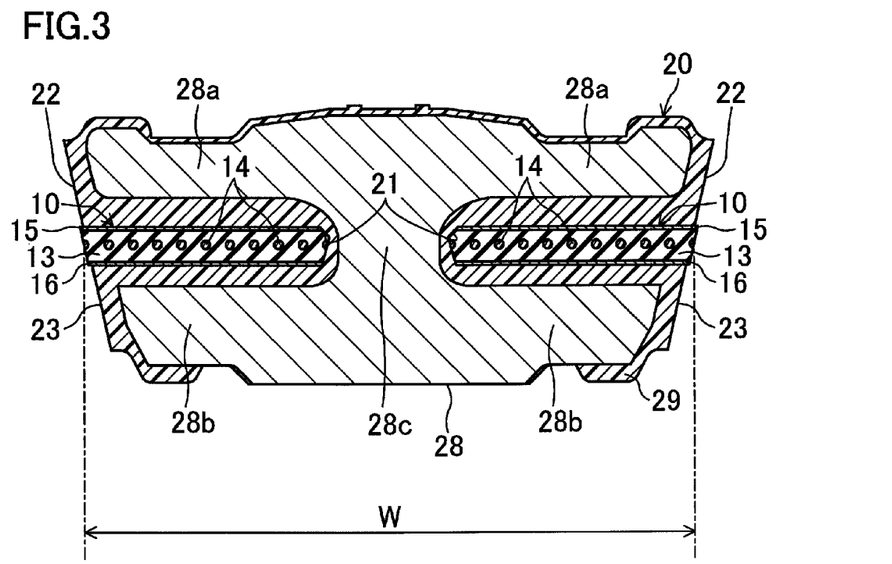
FIG. 3 is a cross-sectional view taken along the line in FIG. 2.

FIGS. 1-3 illustrate a V-belt C for transmitting high load according to an embodiment of the present disclosure. The V-belt C for transmitting high load of this embodiment can be used in a belt-type continuously variable transmission of an automobile, an agricultural machine, and a general purpose machine, for example.

The V-belt C of this embodiment includes a pair of endless tension bands 10 and a plurality of blocks 20. The two tension bands 10 extend parallel to each other in a belt length direction. The plurality of blocks 20 are arranged at regular pitches and at intervals along the two tension bands 10, and fastened on the two tension bands 10. The V-belt C of this embodiment has a belt length of 480-750 mm, a belt pitch width of 20-30 mm, a maximum belt thickness of 9.0-17.0 mm, and is equipped with 96-375 pieces of the blocks 20. The blocks 20 are arranged at arrangement pitches of 2-5 mm and at intervals of 0.01-0.5 mm.

Figure 4A:
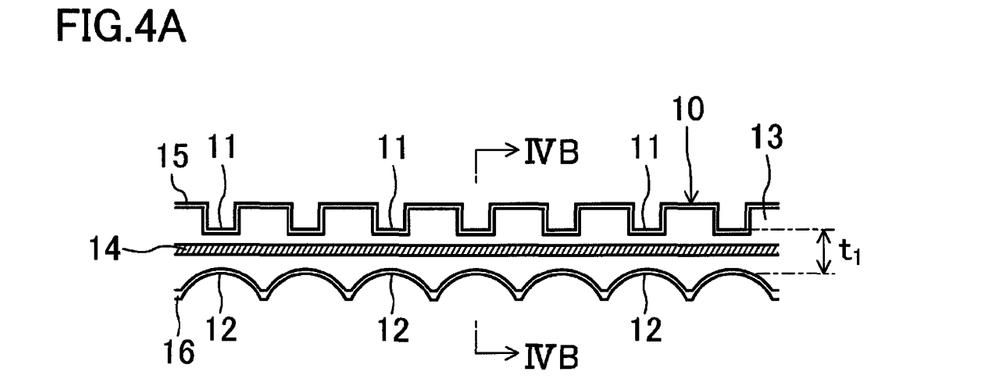
FIG. 4A is a side view of a tension band.
Figure 4B:
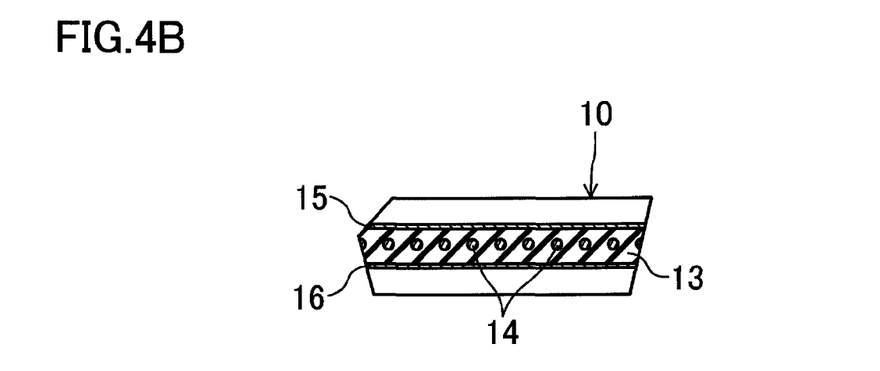
FIG. 4B is a cross-sectional view taken along the line IVB-IVB in the FIG. 4A.

FIGS. 4A and 4B illustrate the tension band 10.

Each tension band 10 has an endless flat band shape. In each tension band 10, a side face has upper and lower portions which have been chamfered to slope, and the other side face is oblique. Each tension band 10 has upper fitting recesses 11 formed on the upper face. The upper fitting recesses 11, which are grooves having a substantially bracket-shaped cross section and extending in a belt width direction, are arranged at regular pitches in the belt length direction. Each tension band 10 also has lower fitting recesses 12 formed on the lower face and corresponding to the upper fitting recesses 11. The lower fitting recesses 12, which are grooves having an arc-shaped cross section and extending in the belt width direction, are arranged at regular pitches in the belt length direction. Each tension band 10 has, e.g., a length of 480-750 mm, a width of 6-13 mm, and a thickness of 1.0-5.0 mm (preferably 1.5-3.0 mm). In particular, the thinnest portions between the bottoms of the upper fitting recesses 11 and the bottoms of the lower fitting recesses 12 have a thickness $t_1$ of 0.606-3.0 mm (preferably 0.606-1.5 mm).

Each tension band 10 includes a tension band body made of a shape-retaining rubber layer 13. A cord 14 which extends in a spiral having pitches in the belt width direction is buried at a substantially middle in the belt thickness direction of the shape-retaining rubber layer 13. An upper reinforcing fabric 15 is adhered to the shape-retaining rubber layer 13 to cover an outside-facing surface of the layer 13. A lower reinforcing fabric 16 is adhered to the shape-retaining rubber layer 13 to cover an inside-facing surface of the layer 13. The tension bands 10 may include only the shape-retaining rubber layer 13 and the cord 14 without being provided with the upper reinforcing fabric 15 and the lower reinforcing fabric 16.

The shape-retaining rubber layer 13 is made of a rubber composition cross-linked with a cross-linker and produced by heating and pressing a non-crosslinked rubber composition prepared by kneading a rubber component blended with various rubber compounding ingredients.

Examples of the rubber component include hydrogenated acrylonitrile rubber (H-NBR); and ethylene-α-olefin elastomers such as ethylene propylene copolymer (EPR), ethylene-propylene-diene terpolymer (EPDM), ethylene-octene copolymer, and ethylene-butene copolymer. The rubber component may be hydrogenated acrylonitrile rubber (H-NBR) which is reinforced by addition of metal salts of an unsaturated carboxylic acid such as zinc dimethacrylate and zinc diacrylate. The rubber component may be made of either a single substance or a mixture of two or more substances. Examples of the compounding ingredients include vulcanization accelerators, plasticizer, reinforcing agents such as silica and carbon black, antioxidants, co-cross-linking agents, cross-linkers, and short fibers.

The cord 14 includes a twisted yarn or a braid which is made of high-strength fibers such as aramid fibers, PBO fibers, or carbon fibers, and to which adhesion treatment has been applied. For example, the cord 14 is made of a bundle of filaments of 800-1200 dtex, and has an outer diameter of 0.5-1.4 mm.

The adhesion treatment of the cord 14 includes: a first treatment step in which the twisted yarn or the braid is immersed in, e.g., an epoxy solution or an isocyanate solution, and heated thereafter; and a second treatment step in which the twisted yarn or the braid is immersed in an RFL solution and heated thereafter. A third treatment step in which the twisted yarn or the braid is immersed in a rubber cement and dried thereafter may be performed. However, the third treatment step is preferably omitted.

Each of the upper reinforcing fabric 15 and the lower reinforcing fabric 16 is made of woven, knitted, or unwoven fabric of aramid fibers or nylon fibers, and produced in the following manner. In a first treatment step, the woven, knitted, or unwoven fabric is immersed in an epoxy solution or an isocyanate solution, and heated thereafter. In a second treatment step, the woven, knitted, or unwoven fabric is immersed in an RFL solution and heated thereafter. A third step in which the woven, knitted, or unwoven fabric is immersed in or coated with a rubber cement and dried thereafter is performed as necessary. Each of the upper reinforcing fabric 15 and the lower reinforcing fabric 16 has a thickness of 0.2-0.4 mm for example.

Figure 5A:
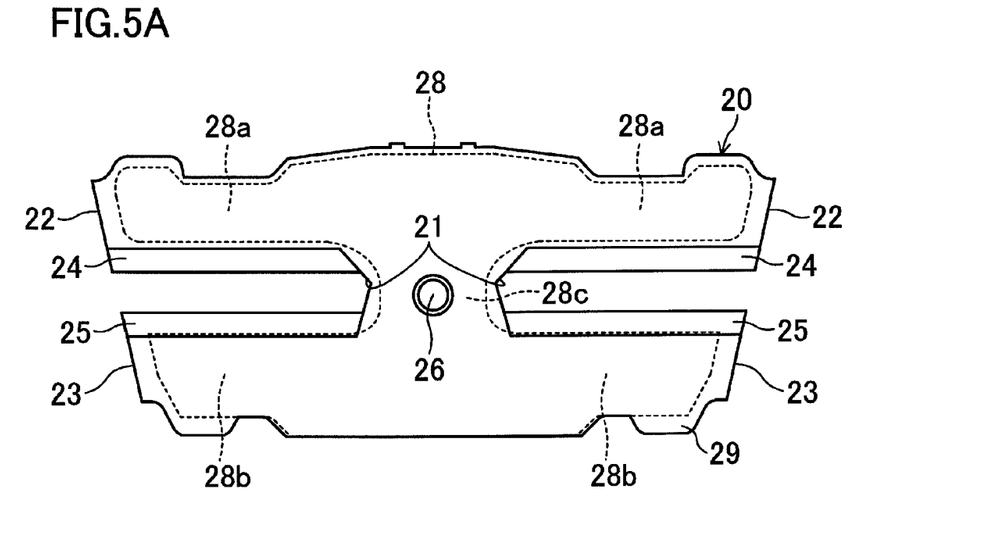
FIGS. 5A and 5B are respectively a front view and a side view of a piece of the blocks.
Figure 5B:
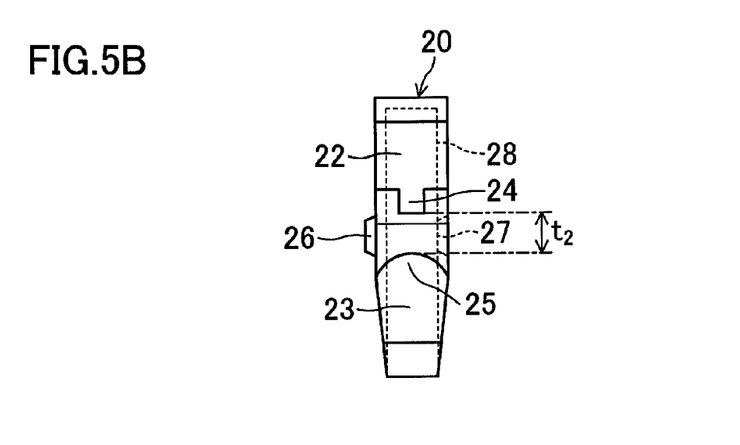

FIGS. 5A and 5B illustrate the block 20.

Each of the blocks 20 is a plate member having a trapezoidal shape of which the upper base is longer than the lower base in a plan view. Each block 20 has a shape similar to a horizontally oriented "H." Specifically, each block 20 has slit-like fitting sections 21 each having an opening on a corresponding one of the block side faces facing each other along the belt width direction. In a side view, each block 20 includes a portion located on and above the corresponding fitting section 21 and having a uniform thickness, and a portion located on and below the fitting section 21 and having a thickness decreasing downward. In both block side faces of each block 20, the portions located on and above the fitting sections 21 serve as upper pulley-contact faces 22 and the portions located on and below the fitting sections 21 serve as lower pulley-contact faces 23. An angle formed by both block side faces of each block 20, i.e., a belt angle, is 20-28° for example.

Each of the fitting sections 21 of each block 20 extends horizontally from its innermost part to the opening located on the block side face, and has a uniform clearance. An upper fitting projection 24 which is a rib extending in the belt width direction and having a substantially rectangular cross section is formed on an upper surface of each fitting section 21. A lower fitting projection 25 which is a rib extending in the belt width direction and having a substantially arc-shaped cross section is formed on a lower surface of each fitting section 21. The innermost part of each fitting section 21 is defined by a sloping surface which continues from the upper surface and slopes inward, and another surface which continues from the sloping surface and slopes outward to the lower surface. Each fitting section 21 has the clearance $t_2$ ranging from 0.6 mm to 2.8 mm (preferably from 0.6 mm to 1.4 mm) in the belt thickness direction, and a depth in the belt width direction, i.e., an insertion width w of the tension band 10, ranging from 6 mm to 13 mm.

Each block 20 has, on a front face, an engaging projection 26 having a truncated cone shape and located at the middle between the two fitting sections 21. Each block 20 also has, on a back face, an engaging recess 27 located at the middle between the two fitting sections 21 in a corresponding manner.

Each block 20 includes a reinforcing member 28 serving as a skeleton framework at the center, and a coating layer 29 covering a surface of the reinforcing member 28. The entire surface of the reinforcing member 28 is not necessarily covered with the coating layer 29. It is sufficient that the coating layer 29 covers at least both block side faces serving as the pulley-contact faces (i.e. the upper and lower pulley-contact faces 22 and 23) and the portions to be in contact with the tension bands 10 (i.e., the upper and lower fitting projections 24 and 25). The other portions of the surface of the reinforcing member 28 may be exposed.

In a manner similar to the block 20, the reinforcing member 28 has a shape similar to a horizontally oriented "H." Specifically, the reinforcing member 28 includes upper and lower beams 28a and 28b which extend in the belt width direction, and a center pillar 28c which extends vertically and connects center portions of the beams 28a and 28b. The reinforcing member 28 is made of a metal material such as aluminum.

The coating layer 29 is made of a short fiber-reinforced resin composition which is prepared by, e.g., kneading a matrix resin blended with short fibers and a resin compounding ingredient. Examples of the matrix resin include thermosetting resins such as a phenol resin and an epoxy resin. The matrix resin may be made of either a single resin or a combination of two or more resins. Examples of the short fibers include carbon short fibers such as polyacrylonitrile-based carbon short fibers and pitch-based carbon short fibers, and para-aramid short fibers. Examples of the resin compounding ingredients include graphite powder.

In the V-belt C for transmitting high load according to this embodiment, the tension bands 10 are fitted into the fitting sections 21 of the plurality of blocks 20, thereby coupling the blocks 20 to one another. Specifically, the tension bands 10 are each inserted into corresponding ones of the fitting sections 21 of the blocks 20 with the chamfered side face directed toward the innermost parts of the corresponding fitting sections 21 in a manner such that: the upper fitting projections 24 on the upper surfaces of the fitting sections 21 of the blocks 20 are fitted into the upper fitting recesses 11 on the upper face of the tension bands 10; the lower fitting projections 25 on the lower surfaces of the fitting sections 21 of the blocks 20 are fitted into the lower fitting recesses 12 on the lower face of the tension bands 10; and one of the side faces of each tension band 10 comes into contact with the innermost parts of the fitting sections 21. In this manner, the plurality of blocks 20 are arranged at regular pitches and at intervals, and fastened on the two tension bands 10 extending parallel to each other in the belt length direction. The upper pulley-contact faces 22 and the lower pulley-contact faces 23 of the block side faces of the blocks 20 and the other side faces of each tension band 10 exposed to the outside together serve as the pulley-contact faces. Between the blocks 20 adjacent to each other, the engaging projection 26 and the corresponding engaging recess 27 are engaged with each other.

Figure 6A:
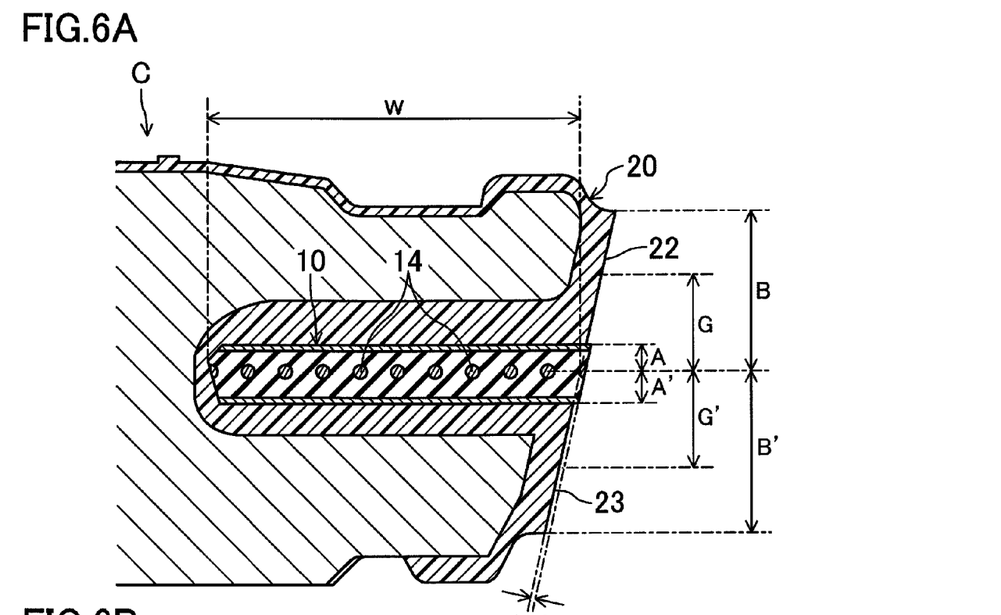
FIGS. 6A and 6B are respectively a partial cross-sectional view and a partial side view in which dimensions A, A', B, B', G, and G' of the V-belt of the embodiment are indicated.
Figure 6B:
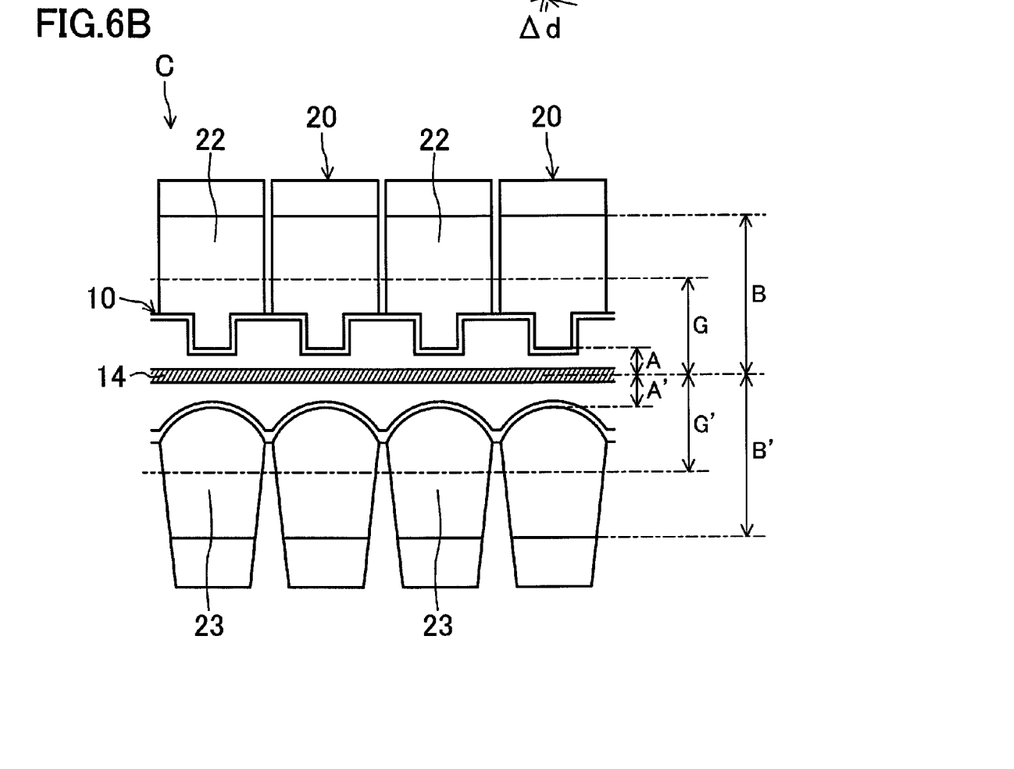

As illustrated in FIGS. 6A and 6B, on each block side face of the blocks 20 of the V-belt C for transmitting high load of this embodiment, a dimension A extending in the belt thickness direction from the buried cord center line (i.e. the belt pitch line) of the corresponding tension band 10 to the lower end of the upper pulley-contact face 22, i.e., to the lower end of the upper fitting projection 24 is 0.4-0.8 mm (preferably 0.4-0.5 mm) for example, whereas a dimension B extending in the belt thickness direction from the buried cord center line to the upper end of the upper pulley-contact face 22 is 3.1-3.8 mm (preferably 3.1-3.4 mm) for example. The ratio (B/A) of the dimension B to the dimension A is larger than or equal to 4.0. Further, a dimension G extending in the belt thickness direction from the buried cord center line to the middle of the upper pulley-contact face 22 is smaller than or equal to 2.3 mm.

Figure 7:
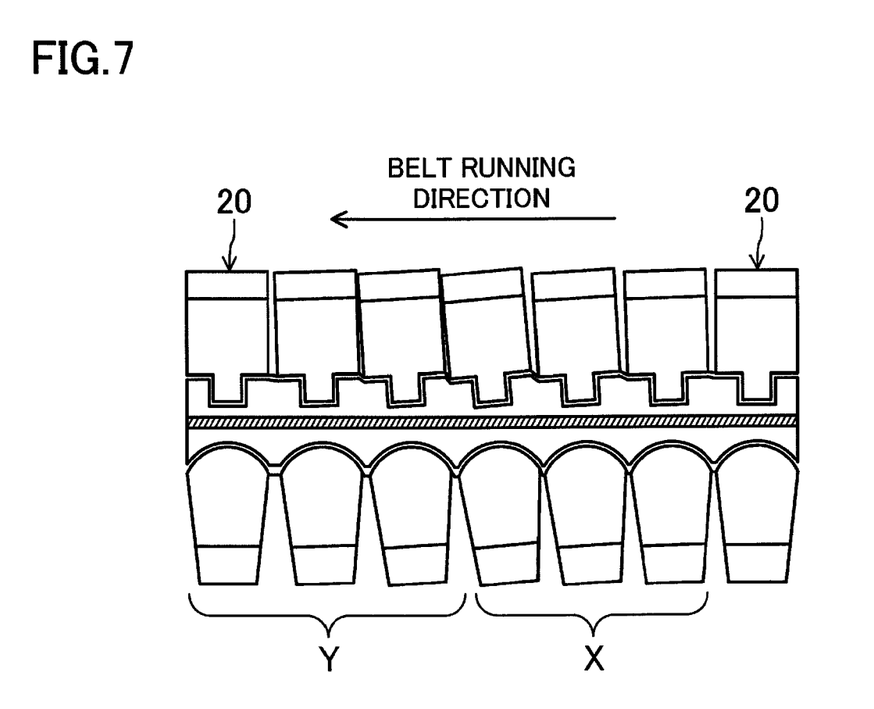

Reference is now made to FIG. 7. The behavior of the blocks 20 is presumed to be as follows: As indicated by the brace X in FIG. 7, when the blocks 20 enters a pulley, the upper pulley-contact faces 22 of both block side faces of the blocks 20 are first pressed by the pulley, and consequently, the blocks 20 are gradually inclined forward in the belt running direction. Then, after the upper pulley-contact faces 22, the lower pulley-contact faces 23, and the side faces of tension bands 10 are pressed by the pulley, the forward-inclined blocks 20 are restored to the original state about the buried cord center line as an axis, as indicated by the brace Y. It is presumed that, at this time, the upper pulley-contact faces 22 slide on the pulley to generate heat, and the generated heat causes a loss leading to reduction of transmission efficiency. On the other hand, in respect of the V-belt C of this embodiment, it is presumed as follows: Since the ratio B/A is larger than or equal to 4.0 and the dimension G is smaller than or equal to 2.3 mm as described above, sliding movement of the upper pulley-contact faces 22 on the pulley is alleviated, and accordingly, the loss is reduced and the transmission efficiency is improved.

In view of the foregoing, the ratio B/A is preferably larger than 4.0, more preferably larger than 6.25, and still more preferably larger than 8.5. Although the upper limit of the ratio B/A is not particularly defined, the upper limit is preferably smaller than or equal to 13, and more preferably smaller than or equal to 12. The dimension G is preferably less than 2.3 mm, and more preferably less than 2.2 mm. Although the lower limit of the dimension G is not particularly defined, the lower limit is preferably larger than or equal to 1.7 mm, and more preferably larger than or equal to 1.8 mm.

On each block side face of the blocks 20 of the V-belt C for transmitting high load of this embodiment, a dimension A' extending in the belt thickness direction from the buried cord center line of the corresponding tension band 10 to the upper end of the lower pulley-contact face 23, i.e., to the upper end of the lower fitting projection 25 is 0.4-0.8 mm (preferably 0.4-0.5 mm) for example. A dimension B' extending in the belt thickness direction from the buried cord center line to the lower end of the lower pulley-contact face 23 is 3.1-4.0 mm (preferably 3.1-3.8 mm, and more preferably 3.1-3.4 mm) for example. A dimension G' extending in the belt thickness direction from the buried cord center line to the middle of the lower pulley-contact face 23 is smaller than or equal to 2.3 mm for example.

When the forward-inclined blocks 20 are being restored to the original state, the lower pulley-contact faces 23 also slide on the pulley. Accordingly, in order to alleviate sliding movement of the lower pulley-contact faces 23 on the pulley, the ratio B'/A' is preferably larger than or equal to 4.0, and the dimension G' is preferably smaller than or equal to 2.3 mm. The ratio B'/A' is preferably larger than 4.0, more preferably larger than 6.25, and still more preferably larger than 8.5. Although the upper limit of the ratio B'/A' is not particularly defined, the upper limit is preferably smaller than or equal to 13, and more preferably smaller than or equal to 12. The dimension G' is preferably smaller than 2.3 mm, and more preferably smaller than 2.2 mm. Although the lower limit of the dimension G' is not particularly defined, the lower limit is preferably larger than or equal to 1.7 mm, and more preferably larger than or equal to 1.8 mm.

Although the dimension A may be either larger or smaller than the dimension A', it is preferable that the dimension A is equal to the dimension A'. Although the dimension B may be either larger or smaller than the dimension B', it is preferable that the dimension B is equal to the dimension B'. Although the ratio B/A may be either larger or smaller than the ratio B'/A', it is preferable that the ratio B/A is equal to the ratio B'/A'. Although the dimension G may be either larger or smaller than the dimension G', it is preferable that the dimension G is equal to the dimension G'.

In the V-belt C for transmitting high load of this embodiment, the belt width W at the buried cord center line (i.e., the belt pitch width W) is, e.g., 20-30 mm in the belt width direction.

In the V-belt C for transmitting high load of this embodiment, the thickness $t_1$ between the upper and lower fitting recesses 11 and 12 of each tension band 10 is slightly larger than the clearance $t_2$ of the fitting sections 21 of the blocks 20. Accordingly, the tension bands 10 fitted into the fitting sections 21 of the blocks 20 are in a compressed state. An interference $(t_1-t_2)$ is, e.g., 0.006-0.150 mm. An interference rate $\alpha$ of the interference $(t_1-t_2)$ to the clearance $t_2$ of the fitting sections 21 of the blocks 20 is written as $\alpha=\{(t_1-t_2)/t_2\}\times 100$, and $\alpha$ is preferably 1-5%.

Further, in the V-belt C for transmitting high load of this embodiment, the tension bands 10 protrude from the block side faces of the blocks 20. With this configuration, shock caused when the V-belt C enters the pulley can be alleviated by the tension bands 10. A protruding dimension $\Delta d$ which is a protruding amount of each tension band 10 is, e.g., 0.02-0.25 mm whereas the insertion width w of each tension band 10 at the buried cord center line is, e.g., 6-13 mm, as described above. A protruding dimension rate $\beta$ of the protruding dimension $\Delta d$ to the insertion width w of each tension band 10 fitted into the blocks 20 at the buried cord center line can be written as $\beta=(\Delta d/w)\times 100$, and $\beta$ is preferably 0.3-1.5%. The protruding dimension $\Delta d$ can be easily measured by scanning the side faces of the V-belt C with a contour measuring device.

Figure 8A:
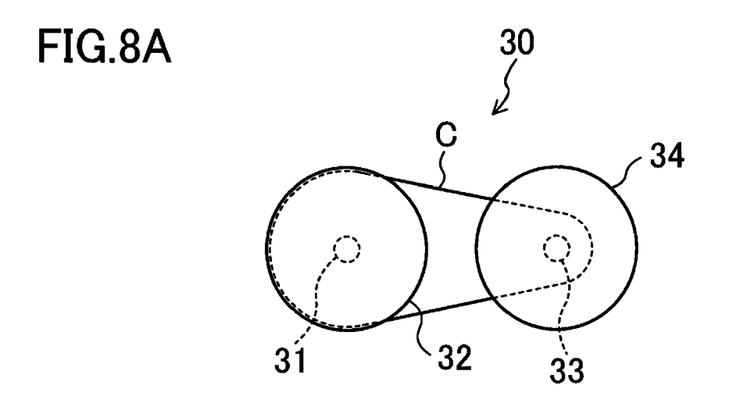
FIGS. 8A and 8B illustrate a pulley layout of a belt-type continuously variable transmission.
Figure 8B:
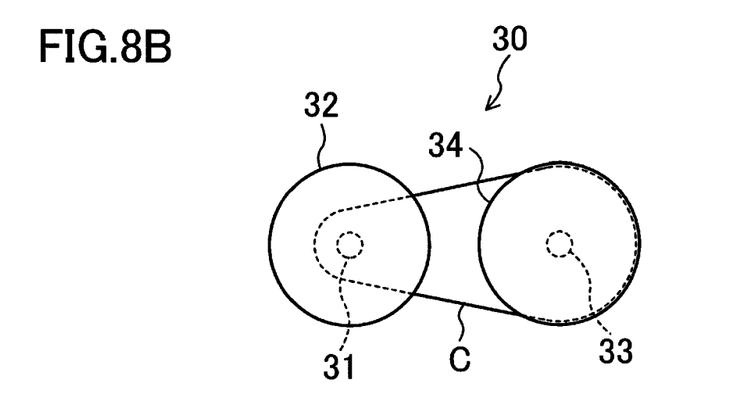

FIGS. 8A and 8B illustrate a belt-type continuously variable transmission 30 in which the V-belt C for transmitting high load of this embodiment is used.

The belt-type continuously variable transmission 30 includes a drive shaft 31 and a driven shaft 33 disposed in parallel with each other. A drive pulley 32 is disposed on the drive shaft 31, and a driven pulley 34 having substantially the same diameter as that of the drive pulley 32 is disposed on the driven shaft 33. The drive pulley 32 has a fixed sheave which is fixed on the drive shaft 31 in a non-slidable manner and rotates together with the drive shaft 31, and a movable sheave which is supported in a slidable manner, faces the fixed sheave, and rotates together with the drive shaft 31. In a similar manner, the driven pulley 34 has a fixed sheave which is fixed on the driven shaft 33 in a non-slidable manner and rotates together with the driven shaft 33, and a movable sheave which is supported in a slidable manner, faces the fixed sheave, and rotates together with the driven shaft 33. In each of the drive pulley 32 and the driven pulley 34, a V-shaped groove is formed between the fixed sheave and the movable sheave. The V-belt C for transmitting high load is wrapped around the V-shaped groove of each pulley. Each of the drive pulley 32 and the driven pulley 34 is capable of varying a pulley pitch diameter in the range from 40 mm to 150 mm.

In the belt-type continuously variable transmission 30, power required for belt transmission is supplied from the drive shaft 31 and consumed by the driven shaft 33. The belt transmission 30 is configured such that a running speed of the V-belt C for transmitting high load can be changed by varying a belt wrapping diameter of the drive pulley 32 and a belt wrapping diameter of the driven pulley 34. Specifically, when the movable sheave is brought close to the fixed sheave in the drive pulley 32 and the movable sheave is brought away from the fixed sheave in the driven pulley 34, the belt wrapping diameter of the drive pulley 32 becomes larger than that of the driven pulley 34, as shown in FIG. 8A. Consequently, the V-belt C is caused to run at a high speed. On the contrary, when the movable sheave is brought away from the fixed sheave in the drive pulley 32 and the movable sheave is brought close to the fixed sheave in the driven pulley 34, the belt wrapping diameter of the drive pulley 32 becomes smaller than that of the driven pulley 34, as shown in FIG. 8B. Consequently, the V-belt C is caused to run at a low speed.

(Fabrication Method of V-belt C for Transmitting High Load)

A fabrication method of the V-belt C for transmitting high load of this embodiment will be described below.

<Step of Preparing Sheet-shaped Non-crosslinked Rubber Composition>

A rubber component is kneaded with a rubber kneading machine such as a Banbury mixer. The rubber component is blended with rubber compounding ingredients, and then, further kneaded. The resultant non-crosslinked rubber composition is formed in a sheet shape by using calendar rolls.

<Step of Preparing Cord>

A twisted yarn or a braid is subjected to adhesion treatment, thereby preparing the cord 14.

<Step of Preparing Upper and Lower Reinforcing Fabrics>

Woven, knitted, or unwoven fabric is subjected to adhesion treatment, thereby preparing the upper reinforcing fabric 15 and the lower reinforcing fabric 16.

<Step of Forming Tension Bands>

The lower reinforcing fabric 16 formed in a cylindrical shape is put to cover a cylindrical mold on which ribs having shapes corresponding to the lower fitting recesses 12 of the tension bands 10 and extending in the mold axial direction are arranged at regular pitches along the circumference of the mold. A predetermined number of layers of the sheet-shaped non-crosslinked rubber composition are provided on the lower reinforcing fabric 16. At this time, although either a grain direction or a contra-grain direction of the sheet-shaped non-crosslinked rubber composition may correspond to the belt length direction, it is preferable that the former corresponds to the belt length direction.

Next, the cylindrical mold is placed in a belt-fabricating device. The device is set to have inner temperature and pressure which allow the non-crosslinked rubber composition to be halfway through crosslinking, and maintained at the inner temperature and pressure during a predetermined period of time. In this period, the non-crosslinked rubber composition reaches a halfway stage of crosslinking, thereby shaping a lower half of the shape-retaining rubber layer 13. Also, the non-crosslinked rubber composition is caused to flow, and the ribs on the cylindrical mold press the lower reinforcing fabric 16, thereby forming the lower fitting recesses 12.

Thereafter, the cylindrical mold is removed from the belt-fabricating device. The cord 14 is wound around the half crosslinked rubber composition at regular pitches, and a predetermined number of layers of the sheet-shaped non-crosslinked rubber composition are provided on the half crosslinked rubber composition having the cord 14 wound thereon. The upper reinforcing fabric 15 formed in a cylindrical shape is put on the layers of the sheet-shaped non-crosslinked rubber composition. At this time, either a grain direction or a contra-grain direction of the sheet-shaped non-crosslinked rubber composition may correspond to the belt length direction.

Next, a cylindrical sleeve is put on the outermost layer. On the inner circumferential surface of the cylindrical sleeve, ribs which have shapes corresponding to the upper fitting recesses 11 and extend in the axial direction are arranged at regular pitches along the circumference of the sleeve.

The cylindrical mold having the above materials and the sleeve provided thereon is placed in the belt-fabricating device, which is set to have predetermined inner temperature and pressure and maintained at the predetermined inner temperature and pressure during a predetermined period of time. In this period, the non-crosslinked rubber composition is caused to flow, and the ribs on the sleeve press the upper reinforcing fabric 15, thereby forming the upper fitting recesses 11. In addition, crosslinking of the non-crosslinked rubber composition and the half-crosslinked rubber composition progresses, thereby forming the shape-retaining rubber layer 13. The adhesive on the surface of the cord 14 and the shape-retaining rubber layer 13 interdiffuse, and consequently, the cord 14 and the shape-retaining rubber layer 13 integrally adhere to each other. Also, the adhesive attached to the upper and lower reinforcing fabrics 15 and 16 and the shape-retaining rubber layer 13 interdiffuse, and consequently, each of the upper and lower reinforcing fabrics 15 and 16 and the shape-retaining rubber layer 13 integrally adhere to each other. In this manner, a cylindrical slab is formed on the surface of the cylindrical mold.

Finally, the cylindrical mold is removed from the belt-fabricating device. The cylindrical slab is removed from the circumferential surface of the mold, and then, sliced into band-shaped pieces having a predetermined width. The sliced pieces are subjected to chamfering, thereby producing the tension bands 10.

<Step of Forming Blocks>

The reinforcing member 28 is set into a cavity having the shape of the block, and clamped. A resin composition is injected into the cavity, and the cavity is cooled. The cavity is then opened to remove the block 20 that is a molding including the reinforcing member 28 covered with the coating layer 29 made of the resin composition. The block 20 is subjected to treatment such as heat treatment required to increase strength.

\<Assembly Step\>

One tension band 10 and the blocks 20 are positioned such that the upper and lower fitting recesses 11 and 12 respectively correspond to the upper and lower fitting projections 24 and 25 of the blocks 20. The tension band 10 is inserted into the fitting sections 21 on the same side of the blocks 20 such that the upper and lower fitting projections 24 and 25 are fitted into the upper and lower fitting recesses 11 and 12, thereby fastening the blocks 20 on the tension band 10. This operation is performed with respect to the entire circumference of the tension band 10 while causing the engaging projections 26 to engage with the engaging recesses 27 between the adjacent blocks 20. In a similar manner, the other tension band 10 is inserted into the fitting sections 21 on the opposite side of the blocks 20. Thus, the V-belt C for transmitting high load can be obtained.

EXAMPLES

V-Belt for Transmitting High Load

V-belts of Examples 1-3 and Comparative Examples 1-5 were fabricated. The configurations of the V-belts are also shown in Table 1.

Example 1

A V-belt for transmitting high load which is similar to the V-belt of the embodiment was fabricated. Specifically, on each block side face of the fabricated V-belt, the dimension A extending in the belt thickness direction from the buried cord center line of the corresponding tension band to the lower end of the upper pulley-contact face was 0.4 mm, whereas the dimension B extending in the belt thickness direction from the buried cord center line to the upper end of the upper pulley-contact face was 3.8 mm, and accordingly, the ratio (B/A) of the dimension B to the dimension A was 9.5. Further, a dimension G extending in the belt thickness direction from the buried cord center line to the middle of the upper pulley-contact face was 2.1 mm. This V-belt was a V-belt of Example 1.

The V-belt for transmitting high load of Example 1 had a belt length of 492 mm, a belt width W at the buried cord center line of 20 mm, a maximum belt thickness of 12.8 mm, a belt angle of 26°, and included 164 pieces of blocks which were arranged at arrangement pitches of 3 mm and at intervals of 0.05 mm.

Further, on each block side face, the dimension A' extending in the belt thickness direction from the buried cord center line of the corresponding tension band to the upper end of the lower pulley-contact face was 0.4 mm, whereas the dimension B' extending in the belt thickness direction from the buried cord center line to the lower end of the lower pulley-contact face was 3.8 mm, and accordingly, the ratio (B'/A') of the dimension B' to the dimension A' was 9.5. Further, a dimension G' extending in the belt thickness direction from the buried cord center line to the middle of the lower pulley-contact face was 2.1 mm.

Each of the tension bands included the shape-retaining rubber layer made of hydrogenated acrylonitrile rubber composition reinforced by addition of zinc dimethacrylate, the cord made of an aramid fiber braid, and the upper and lower reinforcing fabrics made of nylon fiber woven fabric. The reinforcing member of each block was made of aluminum, and the coating layer was made of a carbon fiber-containing phenol resin.

Example 2

A V-belt for transmitting high load of Example 2 was fabricated such that the V-belt had the same configuration as that of the V-belt of Example 1 except that: the dimensions A and A' were each 0.4 mm; the dimensions B and B' were each 3.1 mm; the ratio (B/A) of the dimension B to the dimension A and the ratio (B'/A') of the dimension B' to the dimension A' were each 7.8; and the dimensions G and G' were each 1.8 mm.

Example 3

A V-belt for transmitting high load of Example 3 was fabricated such that the V-belt had the same configuration as that of the V-belt of Example 1 except that: the dimensions A and A' were each 0.8 mm; the dimensions B and B' were each 3.8 mm; the ratio (B/A) of the dimension B to the dimension A and the ratio (B'/A') of the dimension B' to the dimension A' were each 4.8; and the dimensions G and G' were each 2.3 mm.

Example 4

A V-belt for transmitting high load of Example 4 was fabricated such that the V-belt had the same configuration as that of the V-belt of Example 1 except that: the dimension A' was 0.8 mm; the dimension B' was 4.0 mm; the ratio (B'/A') of the dimension B' to the dimension A' was 5.0; and the dimension G' was 2.4 mm.

Comparative Example 1

A V-belt for transmitting high load of Comparative Example 1 was fabricated such that the V-belt had the same configuration as that of the V-belt of Example 1 except that: the dimensions A and A' were each 0.8 mm; the dimensions B and B' were each 4.0 mm; the ratio (B/A) of the dimension B to the dimension A and the ratio (B'/A') of the dimension B' to the dimension A' were each 5.0; and the dimensions G and G' were each 2.4 mm.

Comparative Example 2

A V-belt for transmitting high load of Comparative Example 2 was fabricated such that the V-belt had the same configuration as that of the V-belt of Example 1 except that: the dimensions A and A' were each 1.4 mm; the dimensions B and B' were each 5.4 mm; the ratio (B/A) of the dimension B to the dimension A and the ratio (B'/A') of the dimension B' to the dimension A' were each 3.9; and the dimensions G and G' were each 3.4 mm.

Comparative Example 3

A V-belt for transmitting high load of Comparative Example 3 was fabricated such that the V-belt had the same configuration as that of the V-belt of Example 1 except that: the dimensions A and A' were each 1.4 mm; the dimensions B and B' were each 4.8 mm; the ratio (B/A) of the dimension B to the dimension A and the ratio (B'/A') of the dimension B' to the dimension A' were each 3.4; and the dimensions G and G' were each 3.1 mm.

Comparative Example 4

A V-belt for transmitting high load of Comparative Example 4 was fabricated such that the V-belt had the same configuration as that of the V-belt of Example 1 except that: the dimensions A and A' were each 1.1 mm; the dimensions B and B' were each 3.8 mm; the ratio (B/A) of the dimension B to the dimension A and the ratio (B'/A') of the dimension B' to the dimension A' were each 3.5; and the dimensions G and G' were each 2.5 mm.

Comparative Example 5

A V-belt for transmitting high load of Comparative Example 5 was fabricated such that the V-belt had the same configuration as that of the V-belt of Example 1 except that: the dimensions A and A' were each 1.4 mm; the dimensions B and B' were each 4.5 mm; the ratio (B/A) of the dimension B to the dimension A and the ratio (B'/A') of the dimension B' to the dimension A' were each 3.2; and the dimensions G and G' were each 3.0 mm.

TABLE 1

|  |  | Examples | | | | Comparative Examples | | | | |
|---|---|---|---|---|---|---|---|---|---|---|
|  |  | 1 | 2 | 3 | 4 | 1 | 2 | 3 | 4 | 5 |
| A | mm | 0.4 | 0.4 | 0.8 | 0.4 | 0.8 | 1.4 | 1.4 | 1.1 | 1.4 |
| B | mm | 3.8 | 3.1 | 3.8 | 3.8 | 4.0 | 5.4 | 4.8 | 3.8 | 4.5 |
| B/A | — | 9.5 | 7.8 | 4.8 | 9.5 | 5.0 | 3.9 | 3.4 | 3.5 | 3.2 |
| G | mm | 2.1 | 1.8 | 2.3 | 2.1 | 2.4 | 3.4 | 3.1 | 2.5 | 3.0 |
| A' | mm | 0.4 | 0.4 | 0.8 | 0.8 | 0.8 | 1.4 | 1.4 | 1.1 | 1.4 |
| B' | mm | 3.8 | 3.1 | 3.8 | 4.0 | 4.0 | 5.4 | 4.8 | 3.8 | 4.5 |
| B'/A' | — | 9.5 | 7.8 | 4.8 | 5.0 | 5.0 | 3.9 | 3.4 | 3.5 | 3.2 |
| G' | mm | 2.1 | 1.8 | 2.3 | 2.4 | 2.4 | 3.4 | 3.1 | 2.5 | 3.0 |
| Transmission Efficiency | % | 98.2 | 98.0 | 98.0 | 97.2 | 95.0 | 91.0 | 92.0 | 93.5 | 92.0 |
| Belt Temperature | °C. | 74.0 | 73.5 | 73.0 | 77.0 | 82.0 | 90.0 | 88.0 | 87.0 | 88.0 |

(Test Evaluation Method)

Figure 9:
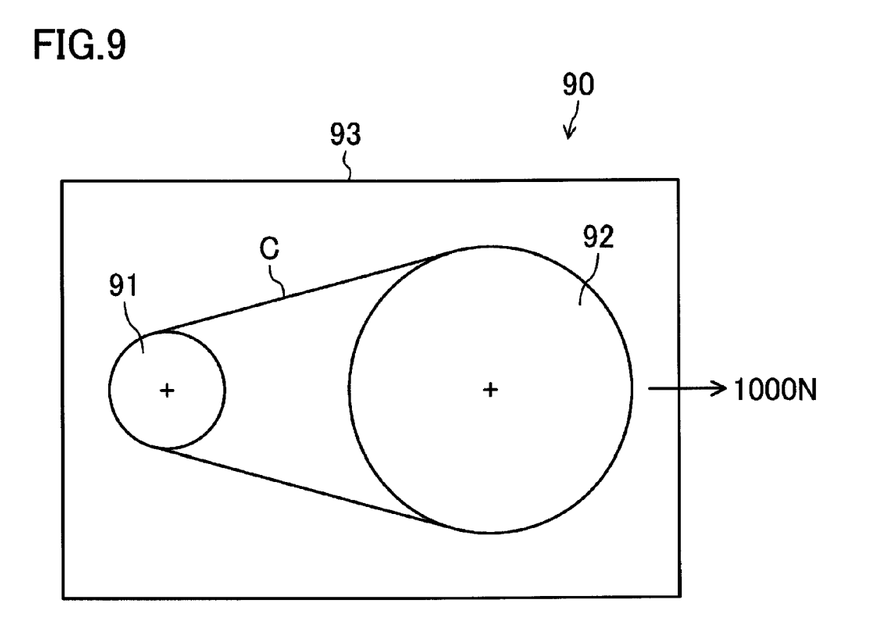
FIG. 9 schematically illustrates a belt running test machine.

FIG. 9 illustrates a belt running test machine 90 which was used in belt running tests conducted to evaluate the below-described matters. The belt running test machine 90 included a drive pulley 91 and a driven pulley 92 which were installed in a chamber 93.

<Transmission Efficiency Test>

Each of the V-belts C for transmitting high load of Examples 1-4 and Comparative Examples 1-5 was wrapped around the drive pulley 91 having a pulley pitch diameter (a diameter defined by the buried cord center line of the wrapped V-belt C) of 45.1 mm and the driven pulley 92 having a pulley pitch diameter of 110.8 mm. A deadweight (DW) of 1000 N was imposed on the driven pulley 92, and the drive pulley 91 was rotated with a drive shaft torque of 15N·m and at 5500 rpm while causing the chamber 93 to have an atmosphere at 25-35° C.

The transmission efficiency was calculated according to the following formula: $((N_2 \times Tr_2)/(N_1 \times Tr_1)) \times 100$, where $N_1$ is an input rpm, $N_2$ is an output rpm, $Tr_1$ is an input torque, and $Tr_2$ is an output torque.

<Belt Heat Generation Test>

In a manner similar to the transmission efficiency test, each of the V-belts C for transmitting high load of Examples 1-4 and Comparative Examples 1-5 was wrapped around the drive pulley 91 and the driven pulley 92. A deadweight (DW) of 1000 N was imposed on the driven pulley 92, and the drive pulley 91 was rotated with a drive shaft torque of 15N·m and at 5500 rpm, while causing the chamber 93 to have an atmosphere at 65° C.

After a lapse of 15 minutes from the start of belt running, the belt temperature of the V-belt C was measured at the belt backside by using a non-contact type thermometer.

(Test Results and Evaluation)

The test results are shown in Table 1.

The transmission efficiency was as follows: Example 1, 98.2%; Example 2, 98.0%; Example 3, 98.0%; Example 4, 97.2%; Comparative Example 1, 95.0%; Comparative Example 2, 91.0%, Comparative Example 3, 92.0%; Comparative Example 4, 93.5%; and Comparative Example 5, 92.0%.

The belt temperature after a lapse of 15 minutes from the start of belt running was as follows: Example 1, 74.0° C.; Example 2, 73.5° C.; Example 3, 73.0° C.; Example 4, 77.0° C.; Comparative Example 1, 82.0° C.; Comparative Example 2, 90.0° C.; Comparative Example 3, 88.0° C.; Comparative Example 4, 87.0° C.; and Comparative Example 5, 88.0° C.

Figure 10A:
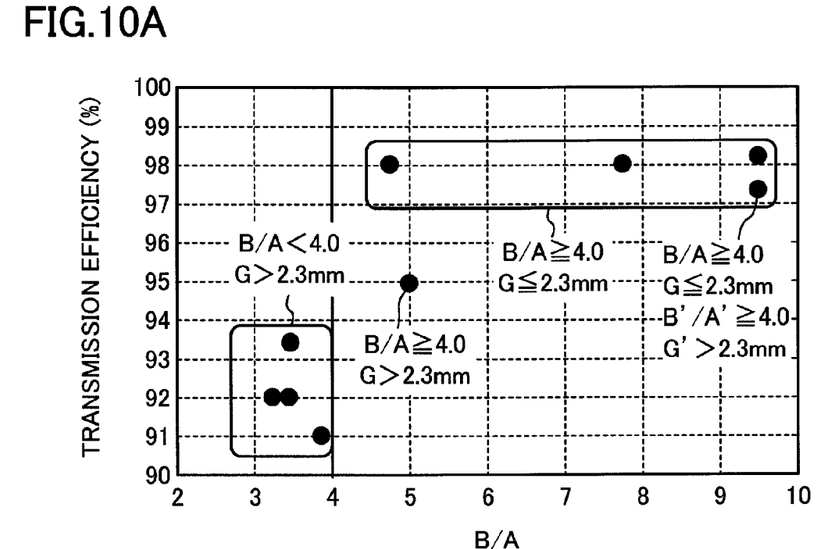
FIG. 10A shows a relation between a ratio B/A and transmission efficiency.
Figure 10B:
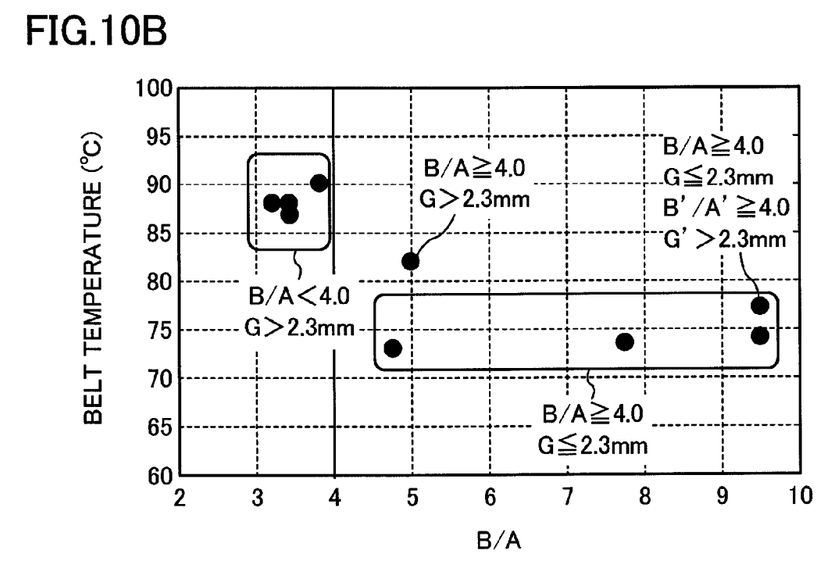
FIG. 10B shows a relation between the ratio B/A and belt temperature.
Figure 11A:
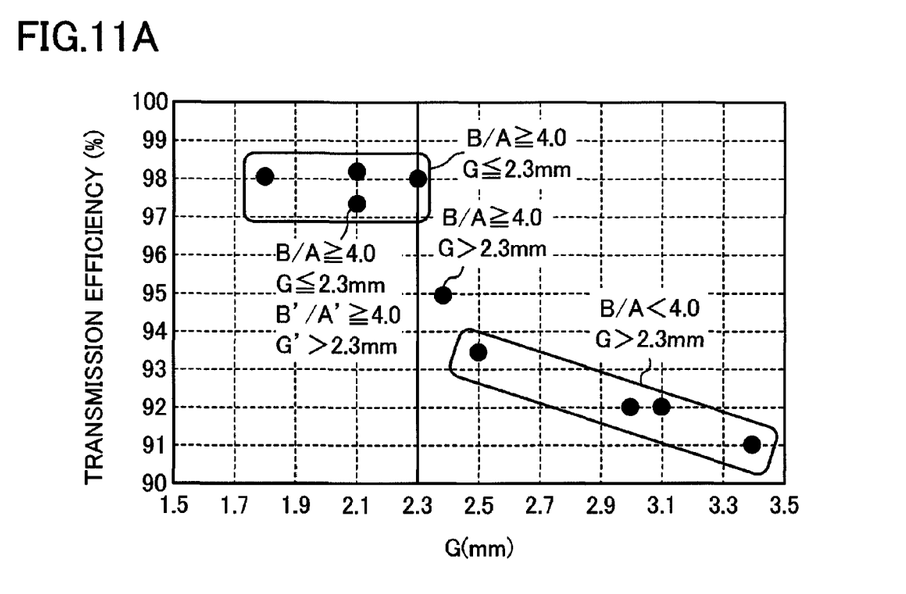
FIG. 11A shows a relation between the dimension G and the transmission efficiency.
Figure 11B:
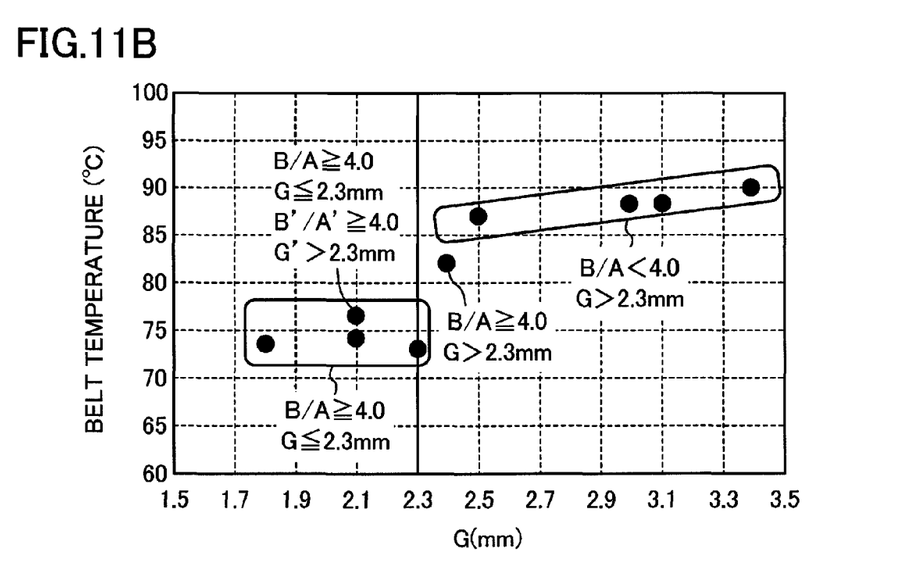
FIG. 11B shows a relation between the dimension G and the belt temperature.

FIG. 10A shows the relation between the ratio B/A and the transmission efficiency, and FIG. 10B shows the relation between the ratio B/A and the belt temperature. FIG. 11A shows the relation between the dimension G and the transmission efficiency, and FIG. 11B shows the relation between the dimension G and the belt temperature.

These results demonstrate that designing a V-belt to have the ratio B/A larger than or equal to 4.0 and the dimension G smaller than or equal to 2.3 mm enables improvement of the transmission efficiency and reduction of heat generation.

The present disclosure is useful for V-belts for transmitting high load.

The embodiment has been described above as an example technique of the p resent disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiment described above is intended to illustrate the technique in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A V-belt for transmitting high load, the belt comprising:
two endless tension bands extending in pairs parallel to each other in a belt length direction, and each including a cord buried therein, the cord extending in a spiral having pitches in a belt width direction; and a plurality of blocks arranged along the two tension bands and each having fitting sections, the fitting sections each opening on a corresponding one of both block side faces of each of the blocks, wherein one of the two tension bands is fitted into corresponding ones of the fitting sections which open on the block side faces located on a side, the other of the two tension bands is fitted into corresponding ones of the fitting sections which open on the block side faces located on the other side, in each of the blocks, a portion of each block side face located on and above the corresponding fitting section serves as an upper pulley-contact face whereas a portion of each block side face located on and below the corresponding fitting section serves as a lower pulley-contact face, and on each block side face of the blocks, a ratio of a dimension extending in a belt thickness direction from a buried cord center line of the corresponding tension band to an upper end of the upper pulley-contact face to a dimension extending in the belt thickness direction from the buried cord center line to a lower end of the upper pulley-contact face is larger than or equal to 4.0, and a dimension extending in the belt thickness direction from the buried cord center line to a middle of the upper pulley-contact face is smaller than or equal to 2.3 mm.

2. The V-belt for transmitting high load of claim 1, wherein on each block side face of the blocks, a ratio of a dimension extending in the belt thickness direction from the buried cord center line of the corresponding tension band to a lower end of the lower pulley-contact face to a dimension extending in the belt thickness direction from the buried cord center line to an upper end of the lower pulley-contact face is larger than or equal to 4.0, whereas a dimension extending in the belt thickness direction from the buried cord center line to a middle of the lower pulley-contact face is smaller than or equal to 2.3 mm.

3. The V-belt for transmitting high load of claim 1, wherein on each block side face of the blocks, the dimension extending in the belt thickness direction from the buried cord center line of the corresponding tension band to the lower end of the upper pulley-contact face is 0.4-0.8 mm.

4. The V-belt for transmitting high load of claim 1, wherein on each block side face of the blocks, the dimension extending in the belt thickness direction from the buried cord center line of the corresponding tension band to the upper end of the upper pulley-contact face is 3.1-3.8 mm.

5. The V-belt for transmitting high load of claim 1, wherein on each block side face of the blocks, a dimension extending in the belt thickness direction from the buried cord center line of the corresponding tension band to an upper end of the lower pulley-contact face is 0.4-0.8 mm.

6. The V-belt for transmitting high load of claim 1, wherein on each block side face of the blocks, a dimension extending in the belt thickness direction from the buried cord center line of the corresponding tension band to a lower end of the lower pulley-contact face is 3.1-4.0 mm.

7. The V-belt for transmitting high load of claim 1, wherein on each block side face of the blocks, the dimension extending in the belt thickness direction from the buried cord center line of the corresponding tension band to the lower end of the upper pulley-contact face is equal to a dimension extending in the belt thickness direction from the buried cord center line to an upper end of the lower pulley-contact face.

8. The V-belt for transmitting high load of claim 1, wherein on each block side face of the blocks, the dimension extending in the belt thickness direction from the buried cord center line of the corresponding tension band to the upper end of the upper pulley-contact face is equal to a dimension extending in the belt thickness direction from the buried cord center line to a lower end of the lower pulley-contact face.

9. The V-belt for transmitting high load of claim 1, wherein on each block side face of the blocks, the ratio of the dimension extending in the belt thickness direction from the buried cord center line of the corresponding tension band to the upper end of the upper pulley-contact face of to the dimension extending in the belt thickness direction from the buried cord center line to the lower end of the upper pulley-contact face is equal to a ratio of a dimension extending in the belt thickness direction from the buried cord center line to a lower end of the lower pulley-contact face to a dimension extending in the belt thickness direction from the buried cord center line to an upper end of the lower pulley-contact face.

10. The V-belt for transmitting high load of claim 1, wherein on each block side face of the blocks, the dimension extending in the belt thickness direction from the buried cord center line of the corresponding tension band to the middle of the upper pulley-contact face is equal to a dimension extending in the belt thickness direction from the buried cord center line to a middle of the lower pulley-contact face.

\* \* \* \* \*

UNITED STATES PATENT AND TRADEMARK OFFICE
CERTIFICATE OF CORRECTION

Page 1 of 1

PATENT NO.       : 8,920,273 B2
APPLICATION NO.  : 14/216804
DATED            : December 30, 2014
INVENTOR(S)      : Ikuhito Doi et al.

It is certified that error appears in the above-identified patent and that said Letters Patent is hereby corrected as shown below:

IN THE SPECIFICATION

In column 6 at line 45, Change "a" to --α--.

IN THE CLAIMS

In column 14 at lines 33-34, In Claim 9, change "of to" to --to--.

Signed and Sealed this
Sixth Day of October, 2015

Michelle K. Lee
*Director of the United States Patent and Trademark Office*